US012314958B2

(12) United States Patent
Hoiles

(10) Patent No.: US 12,314,958 B2
(45) Date of Patent: May 27, 2025

(54) GENERATING CUSTOMER-SPECIFIC ACCOUNTING RULES

(71) Applicant: Sage Global Services Limited, Newcastle-Upon-Tyne (GB)

(72) Inventor: William August Hoiles, West Vancouver (CA)

(73) Assignee: Sage Global Services Limited, Newcastle-Upon-Tyne (GB)

( * ) Notice: Subject to any disclaimer, the term of this patent is extended or adjusted under 35 U.S.C. 154(b) by 282 days.

(21) Appl. No.: 17/955,300

(22) Filed: Sep. 28, 2022

(65) Prior Publication Data

US 2024/0119458 A1 Apr. 11, 2024

(51) Int. Cl.
*G06Q 20/40* (2012.01)
*G06N 3/02* (2006.01)
(Continued)

(52) U.S. Cl.
CPC ............. *G06Q 20/405* (2013.01); *G06N 3/02* (2013.01); *G06N 5/025* (2013.01); *G06Q 20/389* (2013.01); *G06Q 20/4016* (2013.01)

(58) Field of Classification Search
CPC ............... G06Q 20/405; G06Q 20/389; G06Q 20/4016; G06Q 20/401; G06Q 40/12; G06N 3/02; G06N 5/025; G06N 3/045; G06N 3/08; G06N 20/00; G06N 5/01
See application file for complete search history.

(56) References Cited

U.S. PATENT DOCUMENTS

| | | | | |
|---|---|---|---|---|
| 6,601,048 | B1 * | 7/2003 | Gavan | H04M 15/47 706/62 |
| 7,139,731 | B1 * | 11/2006 | Alvin | G06Q 30/0603 705/76 |

(Continued)

FOREIGN PATENT DOCUMENTS

| | | | | | |
|---|---|---|---|---|---|
| AU | 2012209213 | B2 * | 5/2016 | | G06Q 20/405 |
| CA | 2791998 | A1 * | 10/2011 | | G06Q 20/10 |

(Continued)

OTHER PUBLICATIONS

Systems and Methods to Facilitate Loyalty Reward Transactions (Year: 2012).*

(Continued)

*Primary Examiner* — Radu Andrei
*Assistant Examiner* — Nakia Leffall-Allen
(74) *Attorney, Agent, or Firm* — Raubvogel Law Office

(57) ABSTRACT

Various embodiments described herein provide systems and methods for identifying potentially erroneous transactions. A hardware processing device may receive user data indicative of historical actions taken by a user relative to transactions, automatically process the user data to generate a plurality of rules, and automatically apply the rules to a transaction to determine that the transaction is likely to be erroneous. An output device may output a notification to the user to indicate that the transaction is likely to be erroneous. The transaction may have a plurality of attributes, each of which falls within one of a plurality of categories. Automatically processing the user data may include analyzing historical actions of the user relative to historical transactions that also have the attributes. Automatically applying the rules to the transaction may include comparing the attributes of the transaction with the rules.

34 Claims, 9 Drawing Sheets

(51) Int. Cl.
*G06N 5/025* (2023.01)
*G06Q 20/38* (2012.01)

(56) References Cited

U.S. PATENT DOCUMENTS

| | | | | |
|---|---|---|---|---|
| 2009/0005067 | A1* | 1/2009 | Ernst | H04W 4/029 455/456.1 |
| 2009/0106067 | A1* | 4/2009 | Mann | G06Q 10/1093 705/7.18 |
| 2015/0180894 | A1* | 6/2015 | Sadovsky | H04W 12/12 726/22 |
| 2016/0269383 | A1* | 9/2016 | Ryan | G06Q 99/00 |
| 2020/0067861 | A1* | 2/2020 | Leddy | G06F 21/6245 |
| 2020/0259793 | A1* | 8/2020 | Pangeni | H04L 63/0254 |
| 2021/0365832 | A1* | 11/2021 | Hu | G06N 20/20 |
| 2021/0374499 | A1* | 12/2021 | Wu | G06F 17/16 |
| 2023/0153918 | A1* | 5/2023 | Saxena | G06N 5/04 705/30 |

FOREIGN PATENT DOCUMENTS

| | | | | |
|---|---|---|---|---|
| CA | 3129987 A1 | * | 3/2022 | H04L 47/762 |
| WO | WO-2022245706 A1 | * | 11/2022 | G06F 11/0709 |

OTHER PUBLICATIONS

Systems and Methods to Provide Data Services (Year: 2011).*
Systems and Methods of Dynamic Resource Allocation Among Networked Computing Devices (Year: 2022).*
Fault Detection and Mitigation for Aggregate Models Using Artificial Intelligence (Year: 2022).*
Systems and Methods of Dynamic Resource Allocation Among Networked Computing Devices (Year: 2021).*
Rardin, Ronald L., "Optimization in operations research", vol. 166, Chapters 1-7, Prentice Hall Upper Saddle River, NJ, 2015.
Cao, Kaidi et al., "Open-World Semi-Supervised Learning", ICLR 2022, pp. 1-19.
Garcia-Portugues, Eduardo, "Exact risk improvement of bandwidth selectors for kernel density estimation with directional data", Electronic Journal of Statistics, vol. 7, 2013, pp. 1655-1685.
Zafar, Muhammad Rehman et al., "Deterministic Local Interpretable Model-Agnostic Explanations for Stable Explainability", Machine Learning and Knowledge Extraction, vol. 3, No. 3, 2021, pp. 525-541.
Itani, Sarah et al., "A One-Class Classification Decision Tree Based on Kernel Density Estimation", Applied Soft Computing, vol. 91, 2020, p. 106250.

* cited by examiner

FIG. 4A
400
B
Audit Adjustments Journal - Journal Entries
Smart Rules
Step 1: Choose Object to Extend
Smart Rules
Step 2: Select rule properties
$x_i$
$r_i(x)$

FIG. 6A
600
Audit Adjustments Journal - Journal Entries
Transaction
History
Transaction Type
New Transaction Type
ENTRIES

GENERATING CUSTOMER-SPECIFIC ACCOUNTING RULES

TECHNICAL FIELD

The present document relates to techniques for identifying potential errors in accounting entries.

BACKGROUND

Virtually all organizations that handle money need to keep track of transactions. Many elect to do this via various software packages. Unfortunately, errors in the entry process are very common. A transaction can easily be categorized using hundreds of account debit/credit entries. Correct combinations of accounts/dimensions are important for the generation of financial statements that accurately reflect the performance of the organization. As such, some software packages use accounting rules or financial controls that are instantiated when the software is configured.

However, acceptable or common category combinations may not be reflected in the initial software configuration. Accordingly, the rules are non-exhaustive and do not prevent every possible error. The average general ledger entry error percent is in the range of 2.5% to 22% for human entry, and 1% to 20% for semi-automated entry (such as data sourced from other financial software), and finally between 0.01% and 10% for high volume entry systems. The average per-case median recovery of a transaction error is $87,500 to $125,000 (based on KPMG, ACFE, and McKinsey & Company financial reports). These numbers are large enough to skew financial records and cause a company to incur significant costs in excess payments for taxes and vendors, and/or additional accounting efforts to correct the errors.

Existing accounting software products generally fail to provide sufficient error identification, particularly for complex organizations. As a result, accounting errors in such organizations can be common, costly, and difficult to identify.

SUMMARY

Various embodiments described herein provide improved functionality for using machine learning to generate rules for identifying potentially erroneous transactions based on the specific accounting operations of a business. In some embodiments, a method for identifying potentially erroneous transactions may include, at a hardware processing device, receiving user data indicative of historical actions taken by a user relative to transactions, automatically processing the user data to generate a plurality of rules, and automatically applying the rules to a transaction to determine that the transaction is likely to be erroneous. The method may further include, at an output device, outputting a notification to the user to indicate that the transaction is likely to be erroneous.

Automatically processing the user data to generate the plurality of rules may include generating the plurality of rules without reference to any rules provided by the user.

The transaction may have a plurality of attributes, each of which falls within one of a plurality of categories. Automatically processing the user data may include analyzing historical actions of the user relative to historical transactions that also have the same or similar attributes. Automatically applying the rules to the transaction may include comparing the attributes of the transaction with the rules.

Automatically processing the user data to generate the plurality of rules may include representing each of the historical transactions as a mixed vector with a numeric component and a non-numeric component based on the attributes of the historical transactions.

Automatically processing the user data to generate the plurality of rules may further include utilizing a decision tree method that operates directly on the mixed vectors.

Automatically processing the user data to generate the plurality of rules may further include utilizing a one-hot encoding scheme to apply a gradient-based machine learning method to the user data.

Automatically processing the user data to generate the plurality of rules may further include learning an embedding scheme applied to the historical transactions to generate a low-dimensional representation of each of the mixed vectors.

Automatically processing the user data to generate the plurality of rules may further include applying transductive learning to predict attributes that are not labeled in the historical transactions.

Generating the low-dimensional representation of each of the mixed vectors may include applying a deep neural network autoencoder to encode the mixed vectors to generate encoded vectors; and decoding the encoded vectors to generate the low-dimensional representation.

Automatically processing the user data to generate the plurality of rules may include processing the user data without receiving a listing of all possible attributes for at least one of the categories.

Automatically processing the user data to generate the plurality of rules may include learning a manifold that represents the historical transactions and the rules.

Automatically processing the user data to generate the plurality of rules may include applying a loss function.

Automatically processing the user data to generate the plurality of rules may include applying local interpretable model-agnostic explanations (LIME).

The method may further include, prior to automatically applying the rules to a transaction, at an input device, receiving user input indicating that the rules are to be activated.

The method may further include, after outputting the notification to the user, at an input device, receiving user input indicating that the transaction is correct.

The method may further include, in response to receiving the user input indicating that the transaction is correct, modifying the rules to generate modified rules, and automatically applying the modified rules to a second transaction to determine that the transaction is not likely to be erroneous based on similarity between the transaction and the second transaction.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

Figure 1:
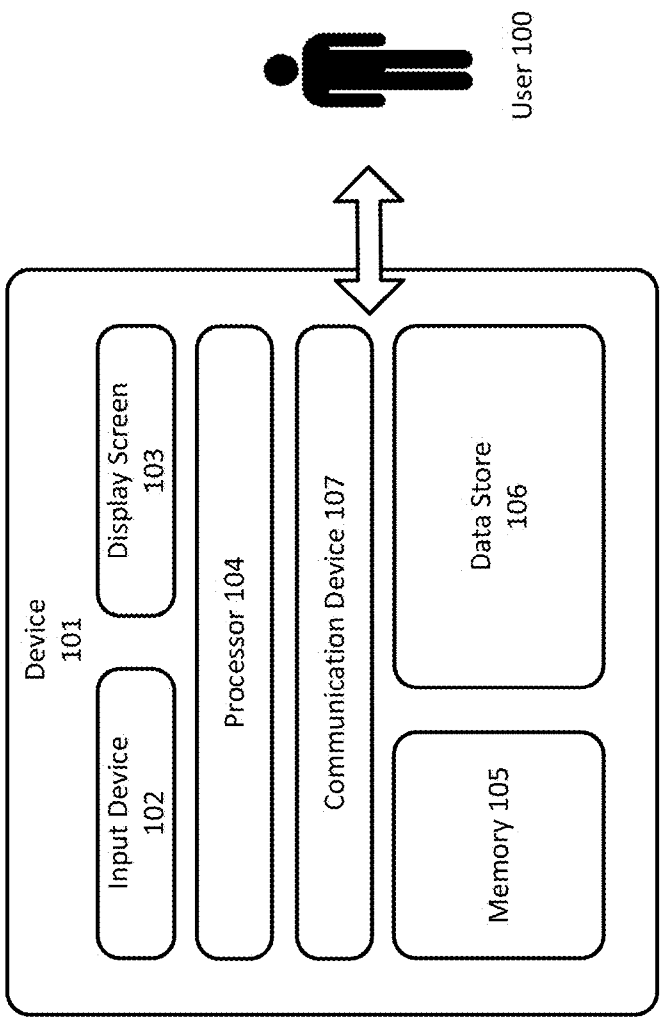
FIG. 1 is a block diagram depicting a hardware architecture for implementing the techniques described herein according to one embodiment.

The systems and methods set forth herein may be applied in many contexts in which it can be useful to identify potential data errors. Accounting represents one of many possible use cases for this technology. Although the following description references the identification of accounting errors, those skilled in the art will recognize that the systems and methods of this disclosure can readily be extended to other fields.

In some embodiments, machine learning techniques may be used to create intelligent smart rules based on the specific accounting operations of a business. It may be advantageous not to impose any a priori assumption on data availability or restrict the data under review to a subset of information in a transaction. Instead, the system may take the opposite approach by learning from as much data and human domain knowledge as possible without restriction. Given this alternative approach, entirely new machine learning methods may advantageously be used not only to ingest mixed numeric and categorical data from nontabular transactions, but also to find new ways of including logic-based rules into the methods. The result may be improvement of transaction consistency both passively (via outlier detection) and proactively (via generation of new accounting rules).

In some embodiments, one or more components, as shown and described below in connection with FIGS. 1 and 2, may be used to implement the system and method described herein. In at least one embodiment, such components may be implemented in a cloud computing-based client/server architecture, using, for example, Amazon Web Services, an on-demand cloud computing platform available from Amazon.com, Inc. of Seattle, Washington. Therefore, for illustrative purposes, the system and method are described herein in the context of such an architecture. One skilled in the art will recognize, however, that the systems and methods described herein can be implemented using other architectures, such as for example a standalone computing device rather than a client/server architecture.

Further, the functions and/or method steps set forth herein may be carried out by software running on one or more of the device 101, client device(s) 108, server(s) 110, and/or other components. This software may optionally be multi-function software that is used to retrieve, store, manipulate, and/or otherwise use data stored in data storage devices such as data store 106, and/or to carry out one or more other functions.

Definitions and Concepts

For purposes of the description herein, a "user", such as user 100 referenced herein, is an individual, enterprise, or other group, which may optionally include one or more users. A "data store", such as data store 106 referenced herein, is any device capable of digital data storage, including any known hardware for nonvolatile and/or volatile data storage. A collection of data stores 106 may form a "data storage system" that can be accessed by multiple users. A "computing device", such as device 101 and/or client device(s) 108, is any device capable of digital data processing. A "server", such as server 110, is a computing device that provides data storage, either via a local data store, or via connection to a remote data store. A "client device", such as client device 108, is an electronic device that communicates with a server, provides output to a user, and accepts input from a user.

A "transaction" is a record of any event involving the exchange of some resource between two entities. It may be a financial transaction, or another type of event. An "erroneous transaction" is a record that includes some erroneous component. An erroneous transaction may be entirely erroneous, or it may include correct aspects in addition to at least one erroneous aspect. A transaction that is deemed "likely erroneous" is one that is comparatively more likely to be erroneous than other transactions analyzed by a system. Thus, a transaction that is "likely erroneous" may, but need not, have a more than 50% likelihood of having an error.

A "rule" is any procedure that can be used to make an automated decision. Rules may be based on binary ("yes" or "no") determinations, or on more complex determinations with more than two output options. A "category" is an aspect of a transaction, such as the company involved, the user who entered or modified the transaction, the business unit to which it pertains, the source or destination of funds, the date of entry, and the like. Transactions can have any number of categories. Categories may include numbers, text, and/or combinations thereof. An "attribute" is any possible value of a category. For example, a "business unit" category may have attributes such as "Sales," "Marketing," "Western U.S.," "Hardware Sales," and/or the like.

System Architecture

According to various embodiments, the systems and methods described herein can be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the systems and methods described herein are designated as client devices, which are generally operated by end users. Other devices are designated as servers, which generally conduct back-end operations and communicate with client devices (and/or with other servers) via a communications network such as the Internet. In at least one embodiment, the techniques described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 includes a number of hardware components that are well known to those skilled in the art. Input device 102 can be any element that receives input from user 100, including, for example, a keyboard, mouse, stylus, touch-sensitive screen (touchscreen), touchpad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store accounting transaction data and/or other data that can be used in tracking transactions for an organization. In addition, data store 106 may store transaction categories, user decisions, and/or rules that can be used to flag potentially erroneous transactions. In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. In at least one embodiment, data store 106 may be implemented using cloud-based storage architectures such as NetApp (available from NetApp, Inc. of Sunnyvale, California) and/or Google Drive (available from Google, Inc. of Mountain View, California).

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100 on display screen 103. In at least one embodiment, an identifying label is also stored along with each data entry, to be displayed along with each data entry.

Display screen 103 can be any element that displays information such as text and/or graphical elements. In particular, display screen 103 may present a user interface for entering, viewing, configuring, selecting, editing, and/or otherwise interacting with transactions as described herein. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

A communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 2:
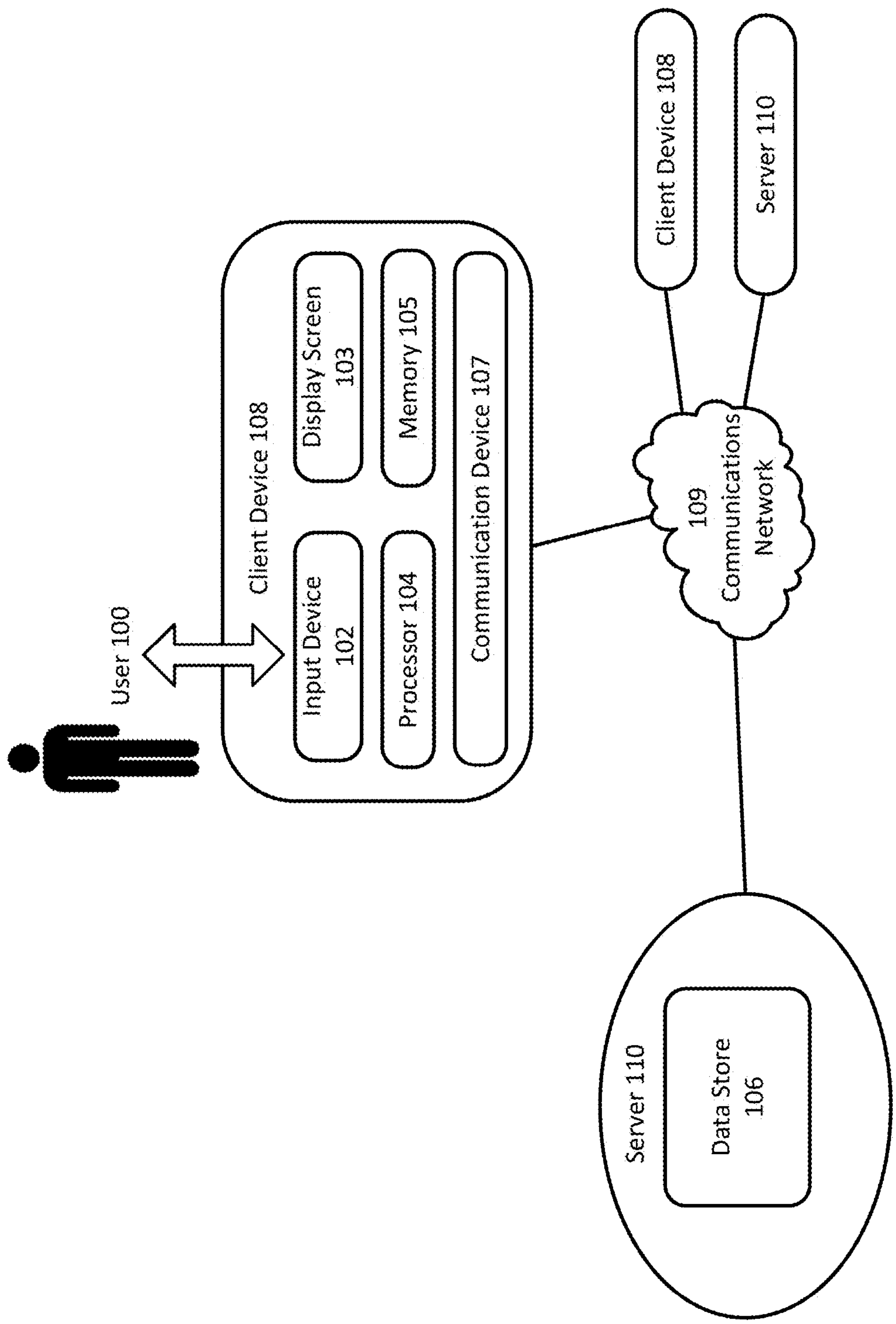
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 is responsible for data storage and processing, and incorporates data store 106. Server 110 may include additional components as needed for retrieving data from data store 106 in response to requests from client device 108.

As described above in connection with FIG. 1, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1, data store 106 may store accounting transaction data and/or other data that can be used in tracking transactions for an organization, as well as information describing rules that can be used to flag potentially erroneous transactions; alternatively, such data can be stored elsewhere (such as at another server) and retrieved as needed.

In addition to or in the alternative to the foregoing, data may also be stored in a data store 106 that is part of client device 108. In some embodiments, such data may include elements distributed between server 110 and client device 108 and/or other computing devices in order to facilitate secure and/or effective communication between these computing devices.

As discussed above in connection with FIG. 1, display screen 103 can be any element that displays information such as text and/or graphical elements. Various user interface elements, dynamic controls, and/or the like may be used in connection with display screen 103.

As discussed above in connection with FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as discussed above in connection with FIG. 1.

In one embodiment, some or all of the system can be implemented as software written in any suitable computer programming language, whether in a standalone or client/server architecture. Alternatively, some or all of the system may be implemented and/or embedded in hardware.

Notably, multiple client devices 108 and/or multiple servers 110 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In one embodiment, some or all components of the system can be implemented in software written in any suitable computer programming language, whether in a standalone or client/server architecture. Alternatively, some or all components may be implemented and/or embedded in hardware.

Technical Challenges

Generating a method to improve transaction consistency both passively (via outlier detection) and proactively (via generation of new accounting rules) poses a number of challenges that are addressed by the systems and methods of the present disclosure. Some of these are listed below.

Slow Rate of Convergence

One common method to surface a potential error in accounting data is to provide an anomaly detection method that can raise an alert to a human operator for further action. Such anomaly detection methods often focus on identifying a pattern (statistical distribution) suggested by the majority of observations, and then classifying as anomalous any observation that does not follow the learned pattern. Known machine learning capabilities for financial accounting generally function based on the principle of performing a binary classification of each accounting entry as either normal or anomalous.

One issue with this assumption is that there are many transactions that are anomalous but are not erroneous. Additionally, the number of transactions that must be observed for a machine learning method to detect a pattern can be quite large. For the average user of an accounting software package, it may take months of financial data to learn a new pattern with sufficient confidence to be of use. Together, the slow rate of learning and the inability to detect errors (only anomalies) may result in customers being bombarded with so many alerts that they become fatigued and end up ignoring most, if not all, alerts. The issue of "too many false positives" is a common customer pain point across known financial accounting packages.

Mixed Data Handling (Categorical and Numerical)

Many known unsupervised anomaly ranking approaches are compatible with numeric data only, leading to categorical features often being ignored in practice. Known methods generally do not support mixed data. However, categorical (non-numeric) features in financial transactions may have a high impact on anomaly ranking performance and thus cannot be blindly or independently considered. For purposes of the description herein, a categorical attribute may be referred to as a "dimension" (e.g., location, department, project, customer, vendor, employee, item, product line, contract, warehouse, or the like). Tagging with dimensions, instead of assigning transactions to hard-coded individual accounts, may enable users to efficiently add business context to their data. The result may be both a reduction in the effort required to set up the chart of accounts, perform transaction entries, and generate financial statements.

Dimensionality

Another challenge to building an effective outlier detection service relates to the type of outliers that may appear. Known ledger- and subledger-focused outlier detection methods generally do not consider transaction outliers. Instead, they examine line-level entries represented as a fixed dimension vector of numeric and categorical parameters that represent information such as the account, debit or credit, amount, and additional tags. However, a transaction may include a collection of line-level entries, ranging from two such entries to the full list of all accounts in the chart of accounts. In many cases, it may be advantageous to consider relationships among the account, debit/credit, and associated dimensional tags.

One approach to represent such data is to construct a fixed-sized vector of cardinality equal to that of the chart of accounts and associated dimensional tags. Most transactions involve debit/credit entries of at most a few dozen accounts, resulting in a vector that is both sparse (i.e., containing many zero entries) and high-dimensional. This high dimensionality may mean that, even for a relatively small chart of accounts, detecting outliers may not be feasible, as all transactions may appear to be completely different or identical.

Obtaining correct generalizations may become more difficult as the dimensionality (number of features) of the examples grows, because a fixed-size training set may cover a dwindling fraction of the input space. Even with a moderate dimension of 100 and a huge training set of a trillion examples, the latter covers only a fraction of about $10^{-18}$ (one quintillionth) of the input space. More particularly, the similarity-based reasoning that machine learning algorithms depend on (explicitly or implicitly) may break down in high dimensions. This is because in high dimensions, all examples look substantially alike. In other words, as the dimensionality increases, more and more examples become nearest neighbors of each other, until the choice of nearest neighbor (and therefore of class) is effectively random.

Fortunately, there is an effect that partly counteracts this phenomenon. In many applications, examples are not spread uniformly throughout the instance space, but are concentrated on or near a lower dimensional manifold. Once such a lower dimensional manifold is found, a variety of machine learning methods become practically useful. In at least one embodiment, the described system and method exploit this non-uniform distribution of examples.

Actionability and Interpretability

Actionability is a major component of any outlier detection service. The level of action that can be taken from an outlier detection service may be directly related to the level of interpretability of the alert. Interpretability may not directly make a model more reliable or its performance better, but it is a valuable part of the formulation of a highly reliable outlier detection capability, and is important in building trust with the user. In the use of machine learning for outlier detection services, laws such as "right to explanation" laws may require interpretability.

For example, the General Data Protection Regulation (GDPR) specifies that people have the right to not to be subject to an automated decision that may result in legal effects or similar significant effects concerning them. In addition, the data controller is required to safeguard the data owner's right to obtain human intervention, to express their point of view, and to contest the decision. In the absence of any indication as to how the outlier detection service makes a decision, there is no way to ensure that such rights are provided. Current outlier detection services provide limited justification as to why a particular general ledger entry was alerted, as they do not directly make automated decisions.

The customer cost of this limited justification results in the human having to perform a detailed, time-consuming analysis as to why an alert was raised and the associated action to take. In at least one embodiment, the system and method described herein may provide more detailed alerts that also specify a set of recommended potential solutions, by way of an interpretable and actionable transaction outlier service.

Financial Controls, Accounting Rule Consistency, and New Rule Recommendations

Accounting software may be designed to increase consistency and robustness across all quantitative monetary transactions throughout an organization. An outlier detection service can only be used to increase consistency if the results are directly used to correct for errors. There is, however, a significantly more powerful method that can be used to increase the consistency and robustness of financial transactions in the form of "smart rules." Most software accounting tools have the ability to define financial controls and accounting rules to increase consistency. However, such tools generally cannot dynamically learn these controls or rules based on each customer's particular accounting needs. In at least one embodiment, the system and method described herein can use historical transactional data and can automatically identify new rules that would improve consistency of transaction entries.

Effectively Using Labeled Transactional Data

Many known outlier detection services in the finance space do not directly use labeled data to provide alerts of potential outliers. Instead, they provide configurable options that allow a user to provide some information regarding their desired risk or scrutiny level. However, a challenge with this approach is that it does not provide any justification for the type of outliers that can be raised, only that a certain percentage of outliers is to be raised. Labeled data with classes of "normal" or "error/fraud" would be incredibly useful, as this would allow supervised machine learning methods to be used to give precise results for future similar transactions. The challenge here is that it requires a huge demand for human resources to sufficiently label data. A popular way to solve such a problem is semi-supervised learning, which may be designed to leverage scarce labeled data and abundant unlabeled data to train an accurate classifier under different scenarios. However, a limitation with directly applying semi-supervised learning methods for error and fraud detection is that there are very few labels, and there are insufficient straightforward structural assumptions that can be made to extend the error of one type of transaction to other classes of transactions.

In at least one embodiment, the system and method provide an open-world semi-supervised learning method in which instances can result from unlabeled data that comes from both seen as well as from novel transactional classes. In open-world semi-supervised learning, the method may advantageously be able to dynamically learn novel classes on the fly. The exact number and type of classes advantageously need not be defined a priori.

Rule Generation Method

According to various embodiments, the system and method described herein are able to learn a low-dimensional transaction manifold given a historical dataset of transactions in addition to any financial control and/or accounting rules that are currently used to ensure consistency of transaction entry. A novel deep learning-based architecture may be provided that can learn such a manifold in the unsupervised, semi-supervised, and/or fully supervised learning scenarios. The only a priori assumption used by the method may be the postulation that such a manifold exists.

The learned transaction manifold can be used for outlier detection and/or transaction classification. In the supervised learning case, the number of transaction classes (or types) need not necessarily be defined a priori. The method may automatically infer the required number of transaction classes. The manifold may beneficially be used to autonomously generate new accounting rules to increase the consistency of transaction entries in any accounting software. For the supervised and semi-supervised learning case, the method may build on model-agnostic local interpretability; however, in the unsupervised case, a novel one-class decision tree classifier may be architected for mixed data to generate accounting rules when no labeled data is present.

In at least one embodiment, the described methods may directly ensure consistency with a priori defined financial controls and accounting rules currently contained in the accounting software.

A detailed explanation of each method will be provided below.

Figure 3:
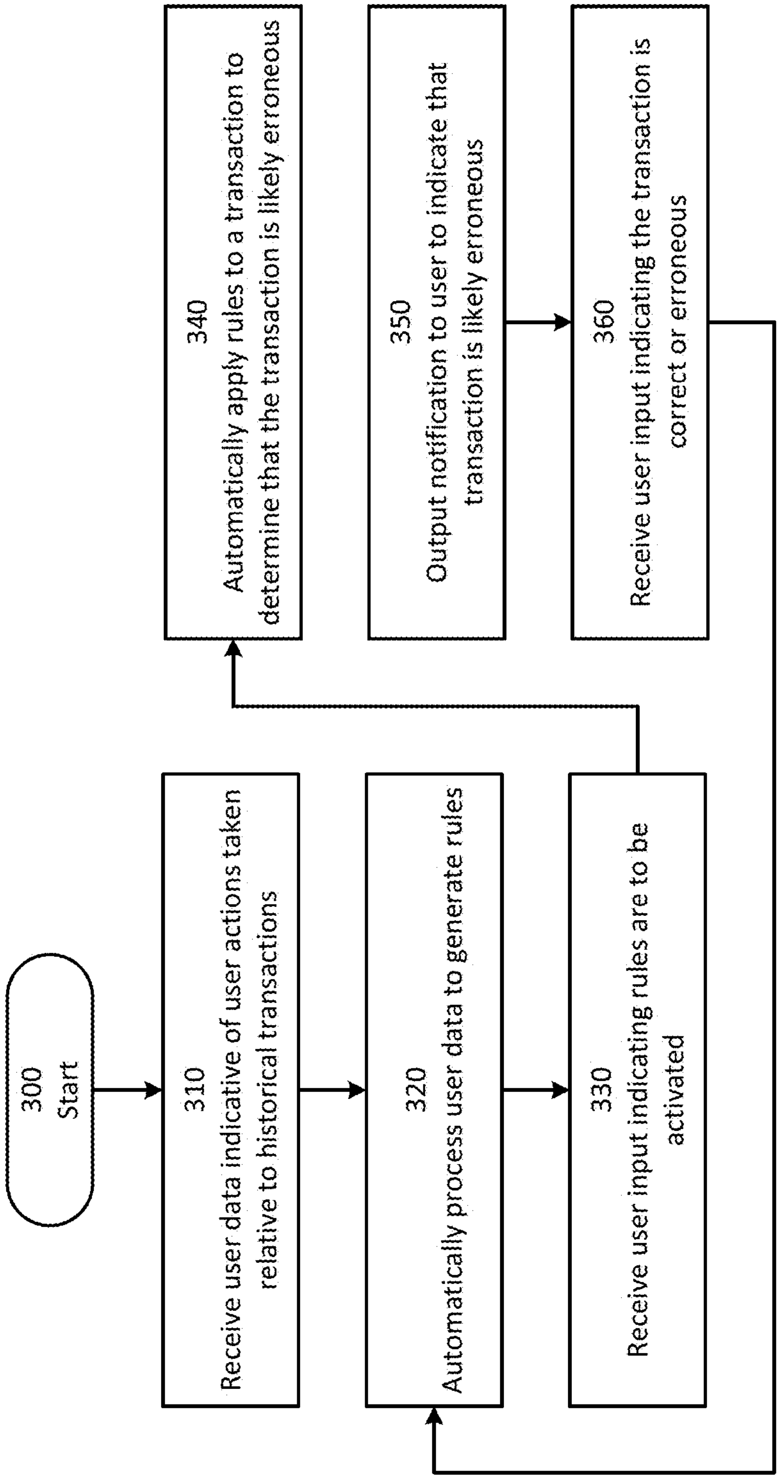
FIG. 3 is a flow diagram depicting an overall method for identifying potentially erroneous transactions according to one embodiment.

Referring now to FIG. 3, there is shown a flow diagram depicting an overall method for identifying erroneous transactions, according to one embodiment. In at least one embodiment, the method depicted in FIG. 3 is performed by electronic components such as those depicted and described above in connection with FIGS. 1 and/or 2. For example, the method may be performed by software running on processor 104, using input from input device 102 and presenting output on display screen 103. One skilled in the art will recognize that the method of FIG. 3 can also be performed using other hardware architectures.

The method of FIG. 3 may be performed upon initial configuration of the system. Additionally or alternatively, the method of FIG. 3 may be performed continuously and/or recursively as the system operates, such that the rules in operation are constantly being updated to reflect new user behaviors and/or other aspects of the operation of the system. The following discussion assumes the operation of a recursive method that continuously ingests new transaction data and updates rules "on the fly."

The method begins 300. The system (for example, at processor 104) may receive 310 user data indicative of user actions taken relative to historical transactions. These user actions may be entry of the transactions, modification of the transactions, categorization of the transactions, intentional flagging of the transactions as being correct or erroneous, and/or the like. The user data may be particular to a single user, or may apply to multiple different users in an enterprise, or even multiple users across multiple enterprises. In some embodiments, the rules to be developed may be specific to a particular user. In other embodiments, the rules may apply across an entire enterprise, or across multiple enterprises.

The system may (for example, at processor 104) automatically process 320 the user data to generate the rules. Further detail regarding how the rules may be generated will be provided below. In addition or in the alternative to the methods set forth below, any known machine learning techniques may be used to generate rules.

The system may for example, at input device 102) receive 330 user input indicating that the rules are to be applied. For example, the system may display one or more of the rules to user 100 via the display screen 103, and user 100 may elect to make the displayed rule or rules active in the system. This input may be received for individual rules and/or sets of rules. This step is optional in some embodiments, no explicit user input may be needed in order to activate rules. Rules generated by the system may simply be activated by default. The system may retain the ability for user 100 to subsequently modify and/or delete rules that are not functioning as desired.

The system may (for example, at processor 104) automatically apply 340 the rules to a particular transaction to determine that the transaction is likely erroneous. This step may entail various comparisons, for example, of attributes of the transaction with attributes set forth in the rules. A decision tree process may optionally be applied, as will be set forth below in greater detail.

The system may (for example, at the display screen 103) output 350 a notification to user 100 to indicate that the transaction is likely erroneous. This output may take any known form such as an email, text message, popup notification, sound, and/or the like. The notification may be sent directly when the likely erroneous transaction is identified, or may be sent at a later time (for example, when user 100 is viewing the likely erroneous transaction, or data aggregated therefrom). The notification may identify the likely erroneous transaction, and may optionally provide additional detail such as the rule(s) and/or attributes) that caused it to be identified as likely erroneous, one or more suggested modifications of the transaction, and/or the like. The notification may include a user interface by which user 100 can provide feedback, for example, confirming that the transaction is correct or erroneous, specifying how the transaction is erroneous, indicating one or more other users who should receive and/or take action regarding the notice, and/or the like.

The system may (for example, at input device 102) receive 360 user input indicating that the transaction is correct or erroneous. This may be done directly in response to the notification provided in the previous step and/or otherwise by user 100. This user input may provide additional details as referenced in the previous step, such as specifying one or more particular errors in the transaction, individuals who should be involved in the correction and/or feedback processes, etc. This is an optional step, as in some embodiments, the system may not receive explicit user feedback regarding whether individual transactions are correct.

Assuming this step occurs, the user input may be received (for example, at processor 104) and used as user data that is automatically processed 320 to generate new and/or revised rules. In the absence of explicit user feedback regarding whether individual transactions are correct, the system may still return to the step 310 and/or the step 320 for further iteration based on alternative user data (for example, user actions or other user input).

Various steps of the method of FIG. 3 will be discussed in greater detail below.

Feature Vector Representation for a Financial Transaction

A transaction may be represented by a mixed vector containing numeric and categorical attributes. Formally, each vector representation of a transaction may reside in the space $R^d \times C^1 \times \ldots \times C^m$ where d is the unique set of accounts defined in the chart of accounts, and in is the total number of dimensions (e.g. department, project, vendor, customer, project, employee, item, class, product line, contract, warehouse, and/or user-defined dimensions). The cardinality (number of unique categorical values) of each of these dimensions need not be equal. If a transaction does not contain a defined category for a dimension, then it may be marked with an additional "Not Applicable" category.

For decision tree-based methods, these can operate directly on mixed vectors containing both numeric and categorical features. However, gradient-based machine learning methods may only be able to learn and perform inference on numeric feature vectors. To make use of categorical variables in these machine learning methods, a one-hot encoding scheme may be utilized.

Different encoding schemes may provide gains in performance. For example, considering categorical feature ordering in the one-hot encoding scheme to maximize correlation characteristics in place of using the simple one-hot encoding scheme may improve performance. The information content in both representations of a transaction may be identical:

$$x\in \mathbb{R}^{d}\times\mathbb{C}^{1}\times\ldots\times\mathbb{C}^{m} \text{ (Decision Tree Representation)}$$

$$x\in \mathbb{R}^{d}\times\{0,1\}^{|\mathbb{C}^{1}|}\times\ldots\times\{0,1\}^{|\mathbb{C}^{m}|} \text{ (Neural Network Representation)}. \quad (1)$$

In at least one embodiment, the learning and inference context may directly define which transaction representation is used. In addition to the transaction information x, the system may also have access to user-defined classifications of each transaction. Outlier robust scaling may be performed on the amount as well to aid with optimization of the deep neural network to a suitable local minimum. A user-specified label may be denoted by y∈{normal, error-type-1, error-type-2, . . . }. The number of initial error types provided to the method may be defined by the set 1, each of which is associated with one or more common transaction errors that have been seen previously. All together, the complete data the system has access to may be given by the two sets:

$$\mathcal{D}_{u}=\{(x_i)\}^{n}_{i=1} \text{ (Unlabelled Transaction Data)}$$

$$\mathcal{D}_{l}=\{(x_i,y_i)\}_{i=1}^{r} \text{ (Labelled Transaction Data)}.$$

$$\mathcal{R}=\{r_i(x)\}_{i=1}^{k} \text{ (Propositional Logic Accounting Riles)}. \quad (2)$$

In most practical applications, the following holds true:

$$|\mathcal{D}_{l}|\ll|\mathcal{D}_{u}|$$

Equivalently, the number of unlabeled observations n may be significantly larger than the number of labeled observations r. Known accounting software systems generally do not have the capability to ingest user feedback which results in r=0. Rather, the only available data is $D_u$ in addition to the financial controls and accounting rules R.

Learning the Financial Manifold of Transactions

One major challenge with transaction data is that it is high-dimensional, sparse, and also often has very few if any labeled instances. In at least one embodiment, a method may be used to learn a lower dimensional representation of financial transactions to increase the efficacy of outlier detection methods and improve automated financial control and accounting rule generation. The embedding is also designed to adhere to all the financial control and accounting rules currently contained in the accounting software. The method may involve two primary phases, including learning the transactional embedding and transductive learning. The embedding phase may allow the system to find a low-dimensional representation where standard machine learning techniques can be utilized to find inliers and outliers. Transductive learning may resolve the problem of predicting the labels of unlabeled instances using the few afforded labels to train the classifier. The system need not impose any a priori assumptions on the embedding space (transaction manifold) with respect to the transactional data. The proposed method may be architected using several concepts from deep clustering, semi-supervised learning, operations research, and/or mathematical programming.

The primary assumption made by the system may be that there exists a low-dimensional manifold M such that if two transactions $x_1$ and $x_2$ are located in a local neighborhood on this manifold, then these transactions will have a similar class label. This assumption may reflect the local smoothness of the decision boundary. One of the problems of machine learning algorithms is the high degree of dimensionality, as described above. It can be difficult to estimate the actual data distribution when volume grows exponentially with dimensions in high-dimensional spaces. If the data lie on a low-dimensional manifold, the learning algorithms can avoid this problem and can operate in the corresponding low-dimension space.

The system may further assume that in this low-dimensional manifold, decision boundaries can be positioned such that they cut through low-density regions while avoiding high-density areas. These boundaries may be used to classify a transaction. The goal of the method may be to learn a manifold that satisfies the low-density separation and manifold assumption.

Deep neural network autoencoders (DAE) may provide a powerful technique to embed high-dimensional sparse data into a (usually dense and low-dimensional) vector at the bottleneck of the network, and then attempt to reconstruct the input based on this vector. An advantage of autoencoders is that they are able to learn representations in a fully unsupervised way. Formally, an autoencoder may be defined by two parts: an encoder function $z=f_\theta(x)$ which maps original data x into a latent representation z∈M, and a decoder that produces a reconstruction:

$$\bar{x}=g_\phi(z)$$

In at least one embodiment, the reconstructed representation is configured to be as similar to x as possible. Any of a variety of different network architectures and training schemes can be used to for the encoder and decoder.

For financial transactions, one may be interested in learning a manifold that represents all the business transactions, accounts for all the financial controls and accounting rules in place, and enables the use of a variety of machine learning methods to detect outliers and generate new accounting rules. All of these tasks can be encoded in the manifold using the loss function. Formally, the loss function and associated optimization problem is:

$$\underset{\theta,\phi,\psi}{\arg\min}\Bigg\{\sum_{x_i\in\mathbb{D}_u}\|x_i-g_\phi(f_\theta(x_i))\|_2^2+ \quad (3a)$$

$$\eta_1\sum_{x_i\in\mathbb{D}_u}\sum_{j\in N_k(x_i)}s(x_i,x_j)\|g_\phi(f_\theta(x_i))-g_\phi(f_\theta(x_j))\|_2^2+ \quad (3b)$$

$$\eta_2\sum_{x_i\in\mathbb{D}_u}\sum_{r\in\mathcal{R}}\mathcal{L}_r(x_i,g_\phi(f_\theta(x_i)))- \quad (3c)$$

$$\eta_3\mathcal{L}_{as}(\mathcal{D}_l)- \quad (3d)$$

$$\eta_4\sum_{x_i\in\mathcal{D}_u\cup\mathcal{D}_l}\sum_{x_j\in N_k(x_i)}\log\left(h_\psi(f_\theta(x_i))\cdot h_\psi(f_\theta(x_j))\right)+ \quad (3e)$$

$$\eta_5 KL\left(\frac{1}{|\mathcal{D}_u\cup\mathcal{D}_l|}\sum_{x_i\in\mathcal{D}_u\cup\mathcal{D}_l}h_\psi(f_\theta(x_i))\|q(y)\right)\Bigg\} \quad (3f)$$

In this system of equations, $f_\theta(x)$ is the encoder, $g_\varphi(x)$ is the decoder, and $h_\psi(z)$ is the classifier with learnable parameters θ, φ, ψ, and $\eta_1, \ldots, \eta_5\in R_+$ hyperparameters of the network. The loss objectives (3a) to (3b) may be used for unlabeled data, and the remaining (3c) to (3f) may be used for labeled data. In typical applications, one would initiate the method given only $D_u$ and R with $\eta_3=\eta_4=\eta_5=0$, then gradually increase these hyperparameters as labeled data is received and reduce the hyperparameter $\eta_1$. Qualitatively, as more labeled data is provided, the spatial locality of the input data may become less informative for both outlier detection and transaction classification. The result may be a dynamic manifold that adapts based on the available data.

An additional hyperparameter that may be used is the number of new transaction types that are expected in the unlabeled dataset $D_u$. The data (2) may already have the pre-specified transaction classes $C_l$; however, the method is designed to dynamically learn new transactions on the fly. In at least one embodiment, the only parameter used for this may be the maximum potential number of new classes in addition to $C_l$. The structure of the objective function (3) may automatically infer the number of new classes by not assigning any instances to unneeded prediction heads. That is, in at least one embodiment, new classes may only be used if needed for unlabeled class instances. Below, the need for each of the loss functions contained in the overall loss objective (3) will be addressed.

In at least one embodiment, the reconstruction loss (3a) may ensure that the manifold contains sufficient information to allow the decoder to be able to reconstruct the original input $x_i$ from the embedded representation $f_\theta(x_i)$ contained on the learned transaction manifold.

The locality preserving loss (3b) may ensure that the learned embedded representation is suitable for clustering—that is, similar instances are expected to be embedded in similar locations on the manifold. The function $s(x_i, x_j)$ is a similarity measure between $x_i$ and $x_j$. The function of (3b) is similar to that used in spectral clustering and Laplacian eigenmaps; however, in this case, there is an embedding performed by the encoder network $f_\theta(x_i)$. Note that the locality preserving loss may account for the local structure (first order proximity) and not the global structure of all transactions. Second order proximity can be accounted for by using a distance measure between two groups of neighborhoods constructed using each $x_i$ and $x_j$ to construct the respective neighborhoods. Intuitively, the second-order proximity may assume that if $x_i$ and $x_j$ share many common neighbors, they tend to be similar. In at least one embodiment, second-order proximity measures may optionally be used only if the first-order proximity measure does not provide sufficient global information to accurately detect outliers. Commonly, the neighborhood $N_k(x_i)$ is evaluated using the k-nearest neighborhood method where k denotes the number of neighbors in the input transaction space. The similarity measure may be provided by the following heat kernel:

$$s(x_i,x_j)=\exp(-\|x_i-x_j\|_2^2/\gamma)$$

In this heat kernel, $\gamma>0$ may be a hyperparameter.

The soft rule regularization loss (3c) may be used to enforce the financial and accounting rules applicable to the financial manifold. These controls and rules may provide powerful domain knowledge specific to each business. To ensure the learned manifold accounts for these rules, all logical controls and constraints may be converted into their equivalent integer programming constraint. Correct formulation of logical conditions sometimes involves considerable ingenuity and can be done in a number of different ways. By definition, the inputs $x_i$ must adhere to these financial controls and accounting rules; however, the reconstructed output from the following decoder may be used to additionally account for these logical conditions:

$$\bar{x}_i=g_\phi(f_\theta(x_i))$$

To impose these constraints, the system may directly place constraint restrictions on the left side of the equation, given $x_i$, and then perform constrained stochastic gradient updates. Alternatively or additionally, for general constraints, the penalty or barrier methods may be used to move the constraint into the objective directly. The result may be that the inferred manifold from the encoder and decoder architecture is, with high probability, consistent with the rules. In other words, the loss (3c) may allow the system to transform explicit human domain-knowledge into the neural model used to generate the transactional embedding.

The generalized softmax loss (3d) may be used. The softmax argument is given by:

$$\begin{aligned}\mathcal{L}_s &= \sum_{(x_i,y_i)\in\mathcal{D}_l} \log(p(y=y_i\mid z_i)) = \sum_{(x_i,y_i)\in\mathcal{D}_l} \log(y_i\cdot h_\psi(f_\theta(x_i))) \\ &= \sum_{(x_i,y_i)\in\mathcal{D}_l} \log\left(\frac{e^{W_{y_i}^\top z_i}}{\sum_{c=1}^{C} e^{W_a^\top z_i}}\right) \\ &= \sum_{(x_i,y_i)\in\mathcal{D}_l} \log \left(\frac{e^{\|W_{y_i}\|\|z_i\|cos(\theta_{y_i,i})}}{e^{\|W_{y_i}\|\|z_i\|cos(\theta_{y_i,i})} + \sum_{c=1, c\neq y_i}^{C} e^{\|W_c\|\|z_i\|cos(\theta_{c,i})}}\right)\end{aligned}$$

In this expression, $y_i\in\{1, \ldots C\}$ are the integer class labels, $z_i$ is the deep embedding representation of $x_i$, and $W_c$ is the final fully-connected weight layer. The expression $p(y=y_i|z_i)$ may indicate the probability of $x_i$ being correctly classified given the embedding $z_i$. Commonly, $z_i=f_\theta(x_i)$ or defined by a multilayer fully-connected neural network with input given by the encoder $f_\theta(x_i)$. The respective class associated with $x_i$ may be estimated by evaluating:

$$c_i = \underset{c\in\{1, \ldots ,C\}}{\operatorname{argmax}} \{W_c^\top z_i\}$$

The softmax loss with the dot product relation illustrates that the norms of the weight and embedding vector in tandem with the angle between these vectors contributes to the posterior probability $p(y|z)$. Without loss of generality, one can impose the column normalization constraint $\|W_c\|=1\forall c\in\{1, \ldots, C\}$ on the weight vector and $z_i=1$ on the embedding vector. The constraint can be directly used in any network formulation by merely dividing the respective vectors by their norm. Introducing a scaling factor $s\in R_+$. The softmax loss may then be:

$$\mathcal{L}_s = \sum_{(x_i,y_i)\in\mathcal{D}_l} \log\left(\frac{e^{s cos(\theta_{y_i,i})}}{e^{s cos(\theta_{y_i,i})} + \sum_{c=1, c\neq y_i}^{C} e^{s cos(\theta_{c,i})}}\right)$$

Given this formulation, the resulting classification model may learn features that are separable in the angular space. Formally, the instances may be embedded on a hypersphere with a radius of s. To enforce intra-class compactness and inter-class diversity, a margin penalty can be included in the softmax loss. One possibility is to introduce an additive angular margin $m\in R+$ such that:

$$\mathcal{L}_{as} = \sum_{(x_i,y_i)\in\mathcal{D}_l} \log\left(\frac{e^{s\cos(\theta_{y_i,i})+m}}{e^{s\cos(\theta_{y_i,i})+m} + \sum_{c=1, c\neq y_i}^{C} e^{s\cos(\theta_{c,i})}}\right). \quad (4)$$

One issue with using a fixed margin in may be that it does not account for class imbalance or the variance of the respective class distribution on the hypersphere. Accordingly, in at least one embodiment, a dynamic method to change the margin based on data imbalance and classification difficulty is used. More precisely, it may be helpful to estimate the parameters of a probability density function of the class distribution that is constrained in the hypersphere manifold. There are a variety of parametric distributions that may be used here including the von Mises-Fisher distribution. Instead of introducing a parametric assumption on the shape of the class distribution on the hypersphere, the system may instead resort to fitting a kernel density estimator (KDE) to evaluate the classification risk to evaluate the class specific margins in that is robust to the presence of outliers. A non-parametric KDE may be used for the directional method.

The class pairwise loss (3e) may be used to enforce that instances that are in close proximity to each other on the manifold are also contained in the same class—that is, grouped together. Geometrically, the dot product between any neighboring points on the manifold may be equivalent to the Euclidean magnitudes of the two vectors $h_\varphi(f_\theta(x_i))$, $h_\psi(f_\theta(x_j))$ and the cosine of the angle between them. The product may be maximal when the two neighboring instances $x_i$, $x_j$ are assigned to the same cluster. Commonly, the neighborhood $N_k(x_i)$ may be evaluated using the k-nearest neighborhood method where k denotes the number of neighbors evaluated in the manifold transaction space.

To keep $h_\psi(z)$ from assigning all instances to a single cluster, the KL divergence regularizer may be included (3f) where $q(\gamma)$ is the prior probability of cluster association. Since knowing prior distribution is a strong assumption, an uninformative uniform prior is commonly used, which results in (3f) being equivalent to the Shannon entropy with respect to the class distribution. This is also known as maximum entropy regularization.

To learn the transactional manifold M given the input data (2), the system may set the hyperparameters and then evaluate the objective function (3).

Anomaly Detection and Recommended Repairs

Given the dataset (2), learned transaction manifold M, the encoder $f_\theta(x)$, and classifier $h_\psi(z)$, the system may determine the next best action when given a new transaction $x^t$. Specifically, the first decision for the human may be to decide whether or not an error is present in the transaction. If yes, then the system may provide recommendations on repairs that can be made to remove the error.

In some cases, deciding whether xt is an error may be relatively simple given the information generated when learning the transaction manifold. First, if the supervised learning objectives have been used, then hψ((fθ(x)) may be used to provide a discrete probability estimate of the potential class associations. If any are above a threshold of confidence, the transaction may be labeled with the associated class. If the supervised objectives were not used, then the system may use information contained in the transaction manifold M to evaluate whether the transaction is normal or an outlier. Any of a variety of machine learning methods may be used, such as for example: local outlier factor, isolation forest, one class support vector machines, local correlation integral, global local outlier scores from hierarchies. If it is an outlier, a k-nearest neighbor method may be applied to find the closest similar transactions that can be used as guidance to provide recommendations on possible repairs. The operation of all these models may be performed in the low-dimensional space M, thus preventing issues regarding high-dimensionality and sparse data from hindering their effectiveness.

Knowledge Recommendation Engine for Financial Controls and Accounting Rules

A major challenge with architecting and maintaining a robust accounting software system is how to generate, catalogue, and continuously ingest new knowledge to improve quantitative financial and accounting decision making. One of the most used knowledge representations is that based on a logical or factual proposition "if-then" rule. In at least one embodiment, a method to autonomously generate rules based on local interpretable model-agnostic explanations (LIME) may be used in the supervised and/or semi-supervised cases. For the unsupervised case, a machine learning method may be used to identify new accounting rules. Both methods may make use of the transaction manifold M given the dataset and rules defined in (2).

Local Interpretability for Supervised Case

In at least one embodiment, LIME may be used to find a local approximation to the global model that is easy to interpret (e.g. linear model or a decision tree). More precisely, the objective of LIME may be:

$$s(x) = \underset{s\in S}{\operatorname{argmin}}\{L(G(x), s(x), \pi_x) + \Omega(s)\} \quad (5)$$

In this expression, S may be a class of interpretable models, G(x) may be the global model, $\pi_x$ may be a distribution that generates samples around a seed instance $x\in D_l$, and $\Omega(s)$ may be a complexity regularizer on the interpretable model s, with $L(\cdot)$ being a loss function. To apply this expression in the supervised learning case, the system may set $G(X)=h_\psi(f_\theta(x))$ as the classifier, with $t\tilde{}\pi_x$ to sample uniformly from the local neighborhood of x on the transaction manifold M. The system may then search for the optimal local function approximation s(x). Given that x may included mixed continuous and categorical features, a decision tree family S may be best suited for constructing a locally interpretable model. Denoting the optimal tree by T, every leaf node of the tree may represent a unique data-driven accounting rule for a specific transaction class. To construct these rules, the system may trace the path from the root to the leaf, and perform an AND operation on all the conditions that the leaf satisfies together:

if $X_1 \Lambda \ldots \Lambda X_n$ then transaction-class

The transaction class rules generated may provide interpretable results that indicate the common errors that are present in the transactions, and may provide recommendations for logic rules that are consistent with "normal" transactions.

Local Interpretability for Unsupervised Case

In at least one embodiment, a non-parametric unsupervised learning method may be used for learning new "if-then" rules given the unlabeled dataset $D'\subseteq D_u$. This unlabeled dataset may contain a minority of outliers, and an existing logic rule base R. The method may be configured to distill the patterns in D' and construct the associated logic rules, while ensuring consistency with previously constructed rules contained in R. The method may account for outliers; however, it may be assumed that the predominant class in D' are inliers. When used for the financial data contained in D' and control rules in R, the result may be a set of new financial controls and accounting rules that increases the consistency of transactions entered via the accounting software.

Any of a number of machine learning techniques may be used to support decision-making. In at least one embodiment, decision trees can be used, as they have been shown to have good classification performance, and can provide relevant information regarding why each decision is made. Specifically, one major advantage of decision tree modeling is the interpretability of the constructed model.

A decision tree is defined as a hierarchical model that associates a given set of attributes with a specific class. In the growth phase of decision tree induction, a key step is to decide how to branch a tree. This step makes use of a measure to assess splits and thereby select one split among a set of candidate splits. As such, decision tree induction is a divide-and-conquer (or nonback-tracking greedy) approach to classification. Though decision trees are very powerful for classification, they may need labeled data to decide how to perform the splits and to terminate growth of the tree. In other words, decision trees may be in the class of supervised machine learning techniques.

In at least one embodiment, the system and method described herein may use decision trees that are specialized for extracting rules from unlabeled transactional data while adhering to previously defined financial controls and accounting rules. Below, the main components of building the tree are defined, including the set of split methods, split evaluation measures, pre-pruning, and stopping criteria for growth.

Given a dataset $D' \sqsubseteq D_u$ and control rules in R, the system may divide the initial hyper-rectangle $X \subset R^d$ in (not necessarily adjacent) sub-spaces $X_{ti}$, represented by tree nodes $t_i$, in the absence of counter-examples. When performing the division at a $node_t$ into sub-spaces $X_{ti}$, the system may take into account whether the split is being performed on a numeric or categorical attribute, and may ensure that the optimal local split does not cause any violations of the base rules R. The basic metrics for measuring the quality of a split may first be constructed. A measure of impurity at a node $X_t$ in the tree may be needed. Common measures for impurity for decision trees are the Shannon entropy and Gini index:

$$I(X_i) = 1 - \sum_{c=1}^{C} p_c^2 \in [0, 0.5] \text{(Gini index)} \tag{6a}$$

$$I(X_i) = -\sum^{C} p_c \log_2(p_c) \in [0, 1] \text{(Shannon entropy)}. \tag{6b}$$

The parameter $p_c$ is the probability of observing the class $c \in \{1, \ldots, C\}$ in the dataset $X_t$ at node t in the tree. Other impurity measures can be used; however, they may all need to satisfy the following conditions: achieve a maximum at uniform distribution of classes, achieve a minimum if there exists a $p_c=1$, and be symmetric with regards to any permutations of the class labels. For a split to be beneficial, it may need to reduce the impurity (or goodness of split):

$$\Delta I(X_t; \{X_{t_s}\}_{i=1}^{m_t}) = I(X_t) - \sum_{i=1}^{m_t} p_i I(X_{t_i}) \tag{7}$$

In this expression, $p_i$ is the proportion of instances from $X_t$ that are contained in sub-space $X_{ti}$. At every node in the decision tree, the goal may be to maximize the local reduction in impurity—or equivalently to maximize the information gain. A limitation with the information gain is that it is biased towards selecting attributes that result in the largest number of splits. The gain ratio may be a modification of the information gain that reduces the bias by accounting for the number and size of branches when selecting the attribute. Formally, it may correct the information gain using a proportionality factor that accounts for the intrinsic information of a split. The potential information generated by dividing $X_t$ into subsets $X_{ti}$ is provided by the split information:

$$I_s(\{X_{t_i}\}_{i=1}^{m_t}) = -\sum_{i=1}^{m_t} \frac{|X_{t_i}|}{|X_t|} \log_2\left(\frac{|X_{t_i}|}{|X_t|}\right) \in [0, 1]. \tag{8}$$

Similar to the Shannon entropy (6b), the split information may be at its maximum when each branch contains an equal number of instances, and at a minimum when a single branch contains all the instances. The gain ratio may be defined as the ratio of information gain and split information:

$$GR(X_t; \{X_{t_i}\}_{i=1}^{m_t}) = \frac{\Delta I(X_t; \{X_{t_i}\}_{i=1}^{m_t})}{I_s(\{X_{t_i}\}_{i=1}^{m_t})}. \tag{9}$$

If the split information is near trivial ($I_s(\ ) << 1$), then the gain ratio may be unstable. To avoid this, an attribute and split may be selected so as to maximize the ratio, subject to the constraint that the information gain must be sufficiently large—at least as large as the average information gain over all the other possible splits and attributes examined.

Given the impurity measures (6) and information gain (7), the system may not focus on how to evaluate these impurity measures in the case that we only have a single class instance. For financial transactions, there may be two possible types of transactions, namely, "normal" or "error" (inliers or outliers); however, the system need not directly observe any errors in the dataset $D_u$. The system may evaluate the quality of a division in a particular context without access to any instance of the error class. At a particular node $X_t$, $n_t$ may denote the number of inliers and n't may denote the number of outliers. The number of outliers at every node may be proportional to the number of inliers such that $n't = \gamma n_t$ for some $\gamma > 0$. This is a counter-intuitive choice but, as will be illustrated, may result in the desired structural result of concentrating the tree around the inliers. Additionally, the outliers may be distributed uniformly on $X_t$. Then, for any sub-space $X_t i \subset X_t$ the count of outliers in $X_t i$ may be:

$$n'_{t_i} = n'_t \frac{Leb(X_{t_i})}{Leb(X_t)} = \gamma n_{t_i} \frac{Leb(X_{t_i})}{Leb(X_t)} = \gamma n_{t_i} \lambda_{t_i} \tag{10}$$

In this expression, Leb(·) may be the Lebesgue measure. The information gain resulting from using the Gini index (6a) may be:

$$\Delta I\left(X_t;\{X_{t_i}\}_{i=1}^{m_t}\right) = \frac{2\gamma}{(1+\gamma)^2} - \frac{2}{(1+\gamma)}\sum_{i=1}^{m_t}\left(\frac{n_{i_t}}{n_t}\right)\left(\frac{\gamma\lambda_{t_i}}{1+\gamma\lambda_{t_i}}\right). \tag{11}$$

Similarly, the information gain when using the Shannon entropy (6b) may be:

$$\Delta t\left(X_t;\{X_{t_i}\}_{i=1}^{m_t}\right) = \log_2(1+\gamma) - \frac{\gamma}{1+\gamma}\log_2(\gamma) - \frac{1}{1+\gamma}\sum_{i=1}^{m_t}\left(\frac{n_{t_i}}{n_t}\right)\left[(1+\gamma\lambda_{t_i})\log_2(1+\gamma\lambda_{t_i}) - \gamma\lambda_{t_i}\log_2(\gamma\lambda_{t_i})\right]. \tag{12}$$

The information gain in both cases may be maximized when the largest number of inliers $n_{ti}$ are concentrated in the smallest subset $X_{ti}$. The split information (8) for the inliers and outliers may be:

$$I_s\left(\{X_{t_i}\}_{i=1}^{m_t}\right) = -\sum_{i=1}^{m_t}\left(\frac{n_{t_i}\lambda_{t_i}}{n_t}\right)\log_2\left(\frac{n_{t_i}\lambda_{t_i}}{n_t}\right). \tag{13}$$

Using the gain ratio instead of information gain may ensure that the system does not merely split across several numeric segments of features unless it is advantageous to do so. The use of the gain ratio may be particularly helpful in cases in which the system is deciding between performing a split between a categorical attribute and numeric attributes. If information gain was used, the system may almost always select to perform splits on categorical parameters compared to numeric ones resulting in suboptimal trees.

Given the evaluation metrics of a split, the next step may be to define how to construct the splits for the numeric and categorical attributes for the decision tree.

Numeric Attribute Split

The first split considered may be whether $X_t$ is to be split across a single numeric attribute. To maximize the gain ratio (9), the method may programmatically generate subsets:

$$\chi_{t_i} \text{ for } i \in \{1, \ldots, m_t\}$$

The subsets may be concentrated on the inlier instances. Kernel density estimation (KDE) may provide a non-parametric method to estimate the probability density function of the numeric attribute. The KDE method may estimate the density function by evaluating:

$$\hat{f}(x) = \frac{1}{|X_t|}\sum_{x_i \in X_+} K_h(x - x_i) \tag{14}$$

In this expression, $K_h(\,)$ is the kernel density function with bandwidth h. Applying the KDE method on an attribute with finite interval support may pose an outstanding challenge as a result of the well-recognized bias at the boundary of the interval(s). That is, the estimate $f\hat{}(x)$ may place positive mass outside the support boundary preventing the estimate from being consistent with the data at the boundary regardless of the data size. The modified transformation-based KDE methods may provide an improved estimate of $f(x)$ that reduces the effects of boundary biases. Accurate estimate of the density function at the boundaries is important as attribute values may be concentrated in these regions, in which case a poor estimate of the boundary will result in the reduction of the estimated number of inliers. There are also a variety of methods to estimate the optimal bandwidth h for a given set of instances $X_{ti}$. This is valuable because the numeric attribute may have a number of unique density shapes such as unimodal with outliers, separated symmetric/asymmetric bimodal, or a number of multi-modalities. The KDE method used may advantageously be able to accurately estimate $f(x)$ in a manner that is consistent with these various potential densities. To construct the subsets $X_{ti}$ from $f\hat{}(x)$, the following shortest generalized confidence interval optimization problem may be evaluated for a given confidence interval $a \in (0, 1)$:

$$\{X_{t_i}\}_{i=1}^{m_t} \in \underset{m_t, X_{t_i}}{\operatorname{argmin}}\left\{\left\|(1-\alpha) - \sum_{i=1}^{m_t}\int_{x \in X_{t_i}} \hat{f}(x)dx\right\|\right\} \tag{15}$$

$$\text{s.t. } X_{t_i} \subseteq X_t$$

$$X_{t_i} \cap X_{t_j} = \emptyset \quad \forall\, i, j \in \{1, \ldots, m_t\}.$$

Evaluating (15) can be performed efficiently using a line search method in combination with a multi-root finding procedure as the argument in the sum is monotonic. The result of the optimization may be the subsets $X_{ti}$ for $i \in E \{1, \ldots, m_t\}$ that can then be evaluated using the gain ratio (9). The confidence interval a may be selected to mitigate the effects of outliers which may have been miss-classified as inliers. Commonly the term used for the confidence interval a is the contamination factor and is typically in the range of (0, 0.05].

Categorical Attribute Binary Split

For categorical attributes, a look-ahead procedure may be used to construct the potential subsets which can then be used in the gain ratio (9); however, in some embodiments, only the categorical attribute split is performed and not the look-ahead splits that may be used for evaluating the gain ratio. At a potential split $X_t$ for a categorical attribute, all potential binary splits may be constructed. There may be a potential $2^{|Xt|-1}-1$ potential binary groupings of the categorical parameters. These may be denoted as the set of all potential groups, and then for each $g \in G$, the system may find the numeric attributes and associated splits using the numeric attribute split evaluation method. The result may be a collection of subsets:

$$\{\{\chi_{t_i}^{gj}\}_{i=1}^{m_{gj}}\}: \forall gj \in g, \forall g \in \mathcal{G}\} \tag{16}$$

In this expression, $\chi_{t_i}^{gj}$ may represent the numeric segment $t_i$ in attribute $g_j$ in group g. The use of the gain ratio (9) may be particularly helpful here, as there is expected to be a large number of splits that grow with a power-law relation as the cardinality of the categorical attribute increases.

Categorical Attribute Multiway Split

The multiway split procedure for categorical attributes may be identical to that of the binary split; however, instead of only evaluating the binary split, the system may evaluate Bell numbers for all the possible partitions of the categorical variable. Optionally, the multiway split may only be considered if the cardinality of the categorical attribute is smaller than 10, which may result in B10=115,975 potential clusters of groups.

Having defined the evaluation procedure and splitting methods, a pre-pruning and stopping criterion may be applied to ensure an interpretable tree is constructed. If the following conditions do not hold, the branch may be removed:

all instances of the attribute have the same value.

minimum number of instances to perform a split on a node.

the quantity $n_t/\text{Leb}\{\chi_t\} \geq \beta$ or the bandwidth $ht<\min\{|xi-xj|:xi, xj \in X_t\}$ then the data granularity may be too sparse to consider splitting.

the numeric attribute was already used previously to split the same target node—may need a minimum span between splits of the same numeric attribute to ensure diversity of splits.

any split that would result in a rule that violates R may not be a viable split as it may be impossible for a transaction to enter the accounting system that violates one or more of the financial controls or accounting rules.

The stopping criteria for the decision tree may result if one of the following is encountered:

maximum depth is reached.

minimum impurity decrease.

maximum leaf nodes.

the system has reached a state in which $v|X|$ inlier instances have been considered as outliers for some $v \in (0, 1)$.

The above may provide all the components to construct a decision tree T that represents all the predominant transactions from a given set $D' \subseteq D_u$ while being consistent with the with previously constructed rules contained in T. Every leaf node of the tree may represent a unique data-driven accounting rule. To construct these rules, the path may be traced from the root to the leaf, and an AND operation may be performed on all the conditions that the leaf satisfies together.

$$\text{if } X_1 \wedge \ldots \wedge X_n \text{ then inlier.}$$

Since the rule creation and maintenance process may be both of high importance and high error risk, the solution presented herein may assist the human experts in this task. This assistance may take the form of an automatic verification of the possibility of conflict or redundancy between each two rules within the set. Identifying rules that can lead to these problems may help experts easily detect and fix a rule that would not yield the desired result or that brings undesired redundancy. It thus may reduce the chances of mistakes and help with the obtainment of a more relevant optimal rule set R*. The relationships between two rules may be:

Disjunction: Two rules r, s∈R may be disjoint if the set of situations that are matched by both rules is empty. The values of at least one of their respective attributes are disjoint.

Overlap: Two rules r, s∈R may overlap if there can exist at least one situation that is matched by rand not by s, at least one situation that is matched by s and not by r and at least one situation that is matched by both r and s.

Inclusion: A rule r∈R may be included in a rule s∈R if all the situations matched by rare also matched by s and s also matches situations that are not matched by r.

Generalized inter-difference matrices may be utilized to check all of these conditions. When selecting whether a rule should be included in the accounting system, all rules (prioritized) that overlap or inclusion may be identified so that the human expert can decide how best to introduce the rule into the system. It may be a preferential decision, as explainability may be more important than strict rule compactness.

Proposed Transaction Trust and Rule Generator Method in Action

This section illustrates how the methods described above may be used in conjunction with a financial management platform such as the Sage Intacct Financial Management Platform. Specifically, a transaction and smart rule user interface as provided by such a platform may be used as a basis for employing the described techniques in order to increase trust and consistency of transactions while simultaneously transitioning the accountant to a manage-by-exception type role. One skilled in the art will recognize that the described techniques are merely examples of how method can be used.

Figure 4A:
FIGS. 4A and 4B are the left and right portions of a schematic flow diagram depicting how the systems and methods described herein can be used to intelligently generate smart rules based on historical transactions and/or previously entered smart rules, according to one embodiment.
Figure 4B:
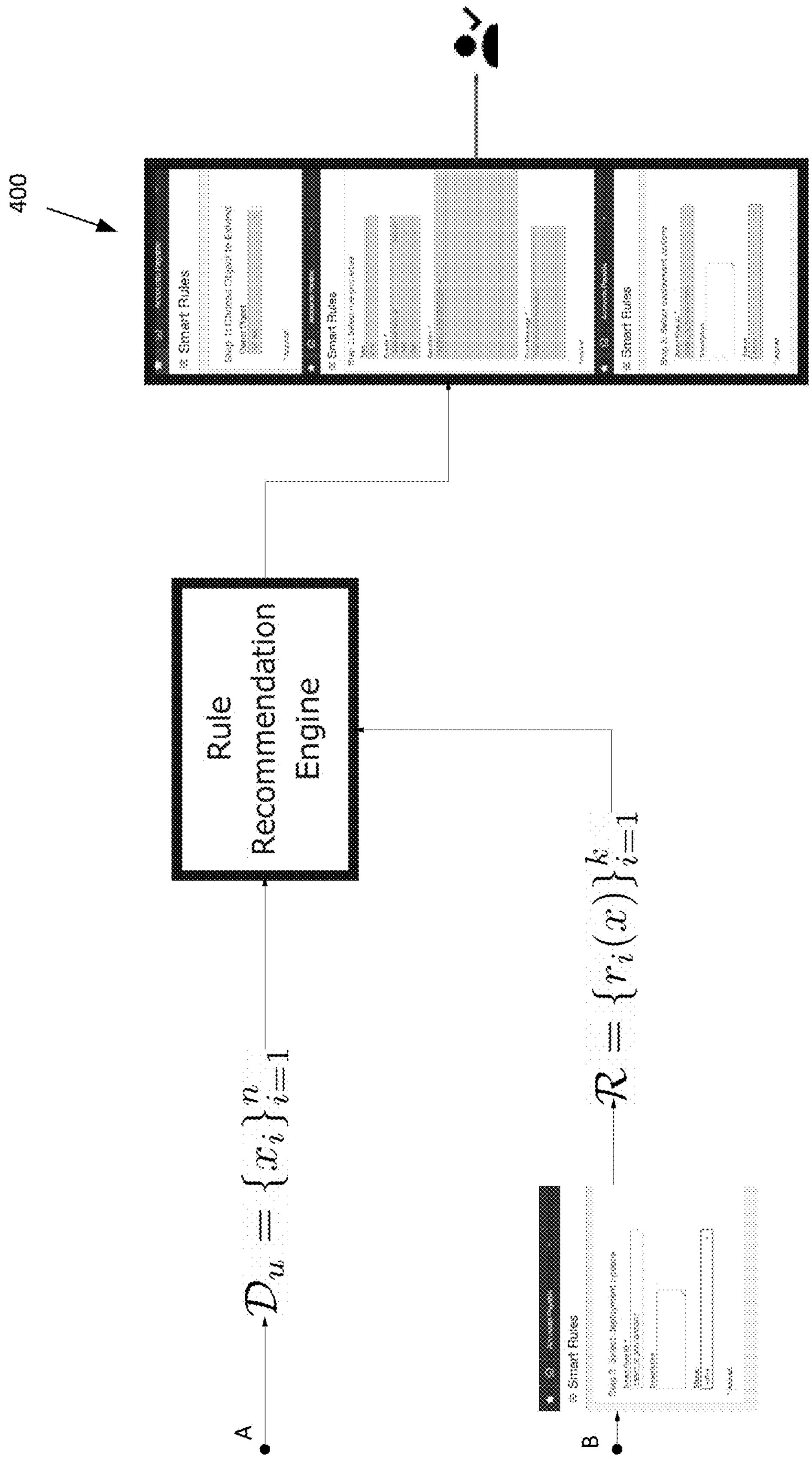

FIGS. 4A and 4B illustrate how the method can be used to intelligently generate smart rules based on historical transactions and/or previously entered smart rules. In the examples of FIGS. 4A and 4B, a user (such as an agent, third party software, and/or the like) has entered n transactions into a financial management platform such as the Sage Intacct Financial Management Platform.

More specifically, FIGS. 4A and 4B are the left and right portions of a schematic diagram 400 depicting entry of n transactions $x_i$ and k smart rules $r_i$. The complete set of all transactions and smart rules may be denoted by the sets $\mathcal{D}_u=\{x_i\}_{i=1}^n$ and $\mathcal{R}=\{r_i(x)\}_{i=i}^k$, respectively. A "Rule Recommendation Engine" may automatically generate new accounting rules for a human to review. As seen, all fields of the smart rule may be automatically populated (green regions), with the only region that needs to be selected by the human is to set the rule to the "Active" state. This can also be automated without the need for any human intervention.

Each transaction may be denoted by $x_i$ and the complete set of transactions may be denoted by $\mathcal{D}_u=\{x_i\}_{i=1}^n$. Another user (or the same user) has also entered k smart rules into the platform. Each smart rule is denoted by $r_i(x)$, and the complete set of smart rules is denoted by $\mathcal{R}=\{r_i(x)\}_{i=1}^k$. The sets $D_u$ and R are merely used to illustrate the information that is sent from the platform to the "Rule Recommendation Engine" which comprises the methods developed and described above. The method may automatically and continuously provide recommendations for new smart rules to increase transaction consistency based on the information provided in $D_u$ and R. New smart rules may only be provided if not already contained in R and the method has sufficient confidence that including such a smart rule would increase the consistency of transactions.

New transactions and smart rules may be added on the fly; the method may be capable of ingesting streaming or high volumes of transaction information and smart rules. This is particularly useful if there are multiple disparate agents (humans, software systems) entering new transactions. The only point where human involvement is recommended may be to transition a recommended smart rule into the "Active" state; however, even here, these can be automatically applied if a sufficient confidence in the smart rule is achieved. That is, the end-to-end generation of smart rules can be entirely automated if so desired.

Figure 5A:
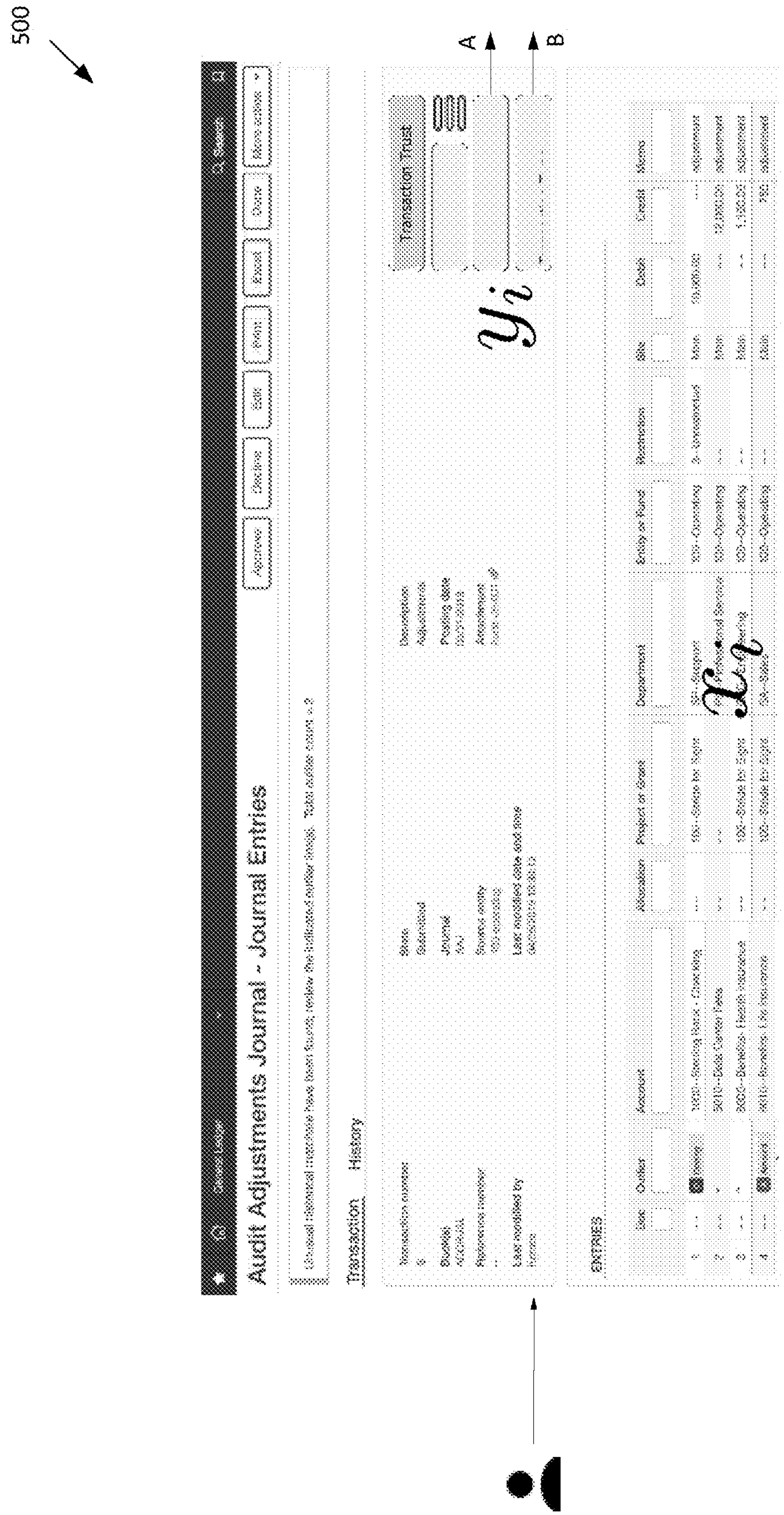
FIGS. 5A and 5B are the left and right portions of a schematic flow diagram depicting a potential user interface displayed when a new transaction is entered into a revised version of an exemplary accounting platform with additional capabilities offered using the systems and methods described herein, according to one embodiment.
Figure 5B:
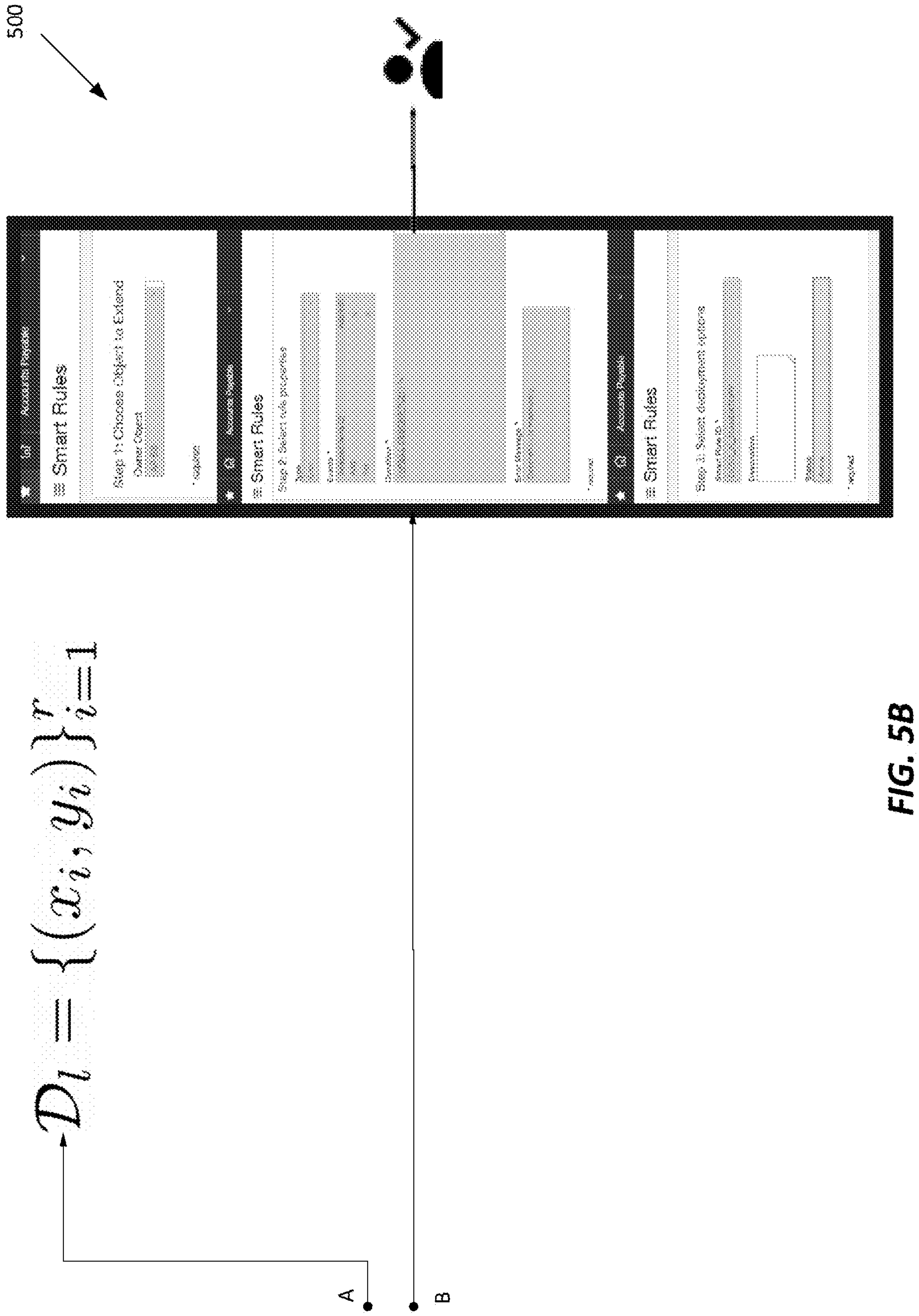

FIGS. 5A and 5B are the left and right portions of a schematic diagram 500 depicting a potential user interface for when a new transaction is entered into a financial management platform that includes the additional capabilities described herein. Here, the reviewer has the potential to take informed actions specific to this transaction such as providing a class label, creating a new class label, or generating a smart rules for this and similar trusted transactions.

More specifically, FIGS. 5A and 5B may relate to a business that has entered a set of transactions and smart rules into the financial management platform (as illustrated in FIGS. 4A and 4B). The system may now consider a new transaction that has been entered into the platform and is currently under review. The proposed method may be capable of providing several useful tools to aid in this review.

The first may be a "Transaction Trust", which indicates how confident the method is in the validity of the transaction—that is, whether similar transactions have appeared in the business previously. In this case, the answer is "yes"; therefore, the associated trust may be high as indicated by the green color. Coarse ordinal ranking is not required here; the proposed method may provide a contiguous numeric value for trust that is comparable across every transaction as it is derived using an identical procedure on the learned transaction manifold.

In addition to the Transaction Trust, the reviewer may also provide transaction labeling information regarding this transaction. The "Transaction Type" may be automatically recommended by the proposed method if labeled information was provided previously, such that, (e.g. $\mathcal{D}_i=\{(x_i, y_i)\}_{i=1}^r$ is nonempty. The reviewer can also select to define a "New Transaction Type" for this transaction. In such a case, this label may be added and the respective transaction manifold and the classification manifold may be updated with this revised information.

In the example shown in FIGS. 5A and 5B, the reviewer has decided to "Generate Smart Rule." Thus, the method may automatically generate a set of smart rules based on this transaction (and locally neighboring trusted transactions on the transaction manifold). Again, the reviewer themselves may not need to be knowledgeable in how to generate smart rules; all the fields may be auto-populated by the method. The reviewer may merely need to transition the respective rule to "Active." Just as with the previous example, this entire process can be automated.

Figure 6A:
FIGS. 6A and 6B are the left and right portions of a schematic flow diagram depicting a potential user interface displayed when a new transaction with a low trust score is entered, according to one embodiment.
Figure 6B:
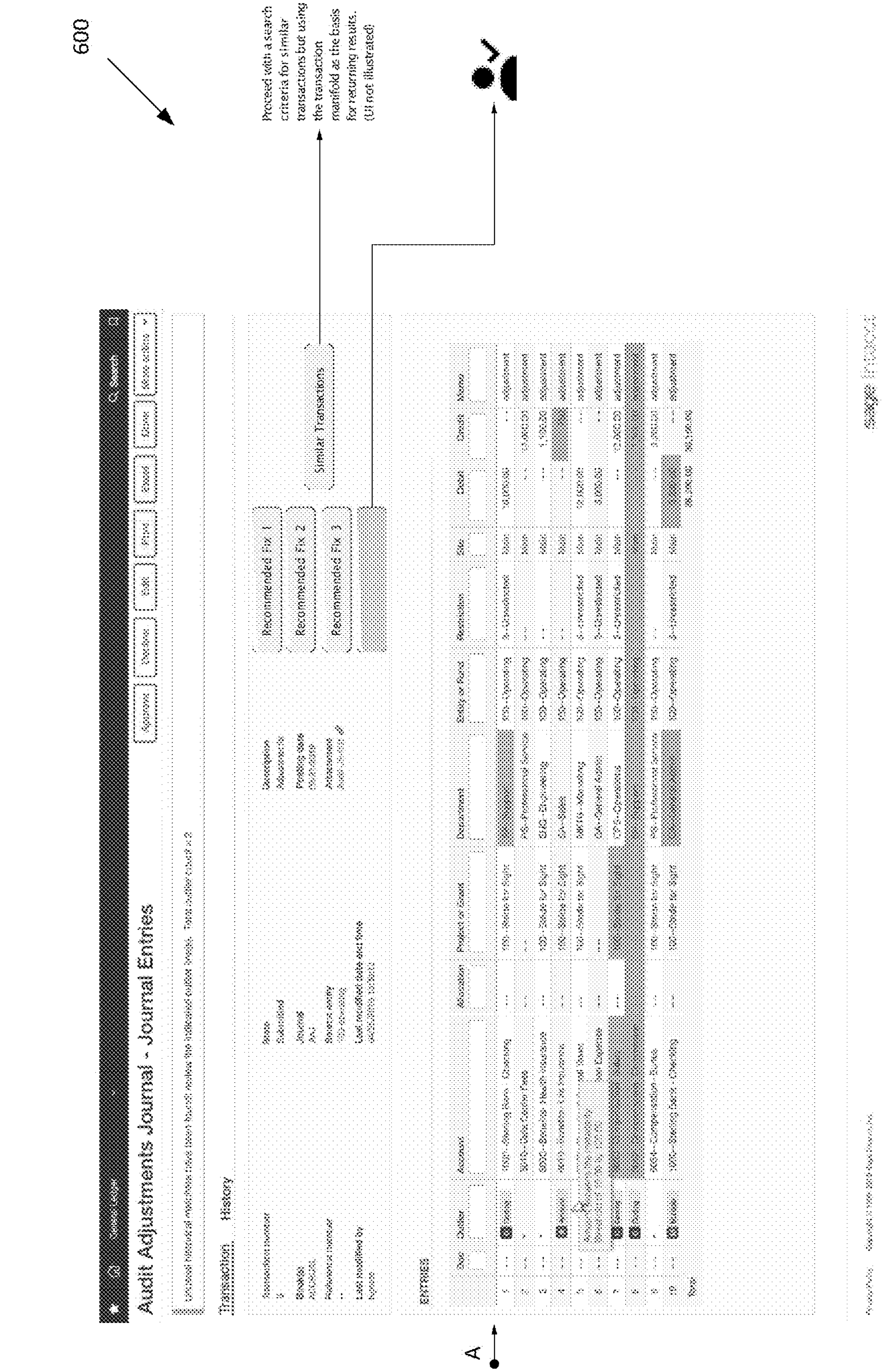

FIGS. 6A and 6B are the left and right portions of a schematic flow diagram 600 depicting a new transaction that is entered into the system that has a low trust score, as indicated in red. The panel on the right may allow a reviewer to see the justification for the low trust score, provide recommended fixes, and/or enables further root cause investigation using information supported using the learned transaction manifold and transaction classification manifold. The specific illustration shown depicts the reviewer selecting the "Recommended Fix 4".

More specifically, FIGS. 6A and 6B may relate to a new transaction has been entered into the platform and is currently under review. The difference between this transaction and the previous transaction in FIGS. 5A and 5B may be that the proposed method does not trust this transaction—it has not seen similar transactions previously. The reviewer in this case may be aware that this transaction does not contain errors and is a common year-end transaction. In such a case they can select "New Transaction Type," which may inform the method that this is a trusted transaction with a specific transaction type (e.g., "year end . . . .").

In the following year, if this type of transaction is received, the system may detect this using the transaction classifier and may provide the "Transaction Trust" in green. Although it is still considered a statistical outlier, it may be trusted as the transaction type is known. This is a major step compared to other purely outlier based methodologies as the proposed method uses all the available transaction, smart rule, and labeled information to make decisions. Here, however, the reviewer has selected the "Transaction Trust" to investigate why the proposed method has defined this transaction of having a low trust (e.g., red color). This transitions them to a new panel in which all the fields of the transaction that look suspicious are indicated.

The system may provide several recommendations on potential fixes that the reviewer can use to increase the trust of the transaction. Additionally or alternatively, the reviewer can also view any similar transactions if so desired. In the depicted example, the reviewer has selected the "Recommended Fix 4" as there was a coding issue that is resolved using this recommendation.

The systems and methods presented herein may have several advantages. The system may be able to learn from all available domain knowledge contained in any accounting software (e.g. transactional data, labeled transactional data, financial controls, accounting rules, or any subset of these). The method may then be used for transaction classification, outlier/novelty detection, and/or adaptive accounting rule generation. All of these may be unique to each business. As a first-in-class method, the method may be used for generating entirely new paradigms for how controllers and reviewers interact with their accounting software to increase both trust of their transactions and improve the overall consistency of their accounting software. A major advantage of the method may be that it can continuously adapt to the organization's business activity as it utilizes both the transactional data and associated controls to provide recommendations. As new rules and transactions are added (either manually or from recommendations), they can provide the basis for learning new rules to increase transaction consistency. In this manner, the method may continue to improve the operation of the accounting software.

The method may be used in any setting in which quantitative financial transactions are present. It may have particular utility in settings in which, in addition, financial controls and accounting rules are also present. It may allow automated generation of new rule recommendations based on each business's unique transaction patterns. Use cases include detection of transactional abnormalities in the General Ledger, Accounts Payable, Accounts Receivable, etc., and automated construction of associated accounting rules to improve the consistency of transactions in these respective ledgers.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to convey the substance of their work most effectively to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for identifying potentially erroneous transactions, comprising:

at a hardware processing device:

receiving user data indicative of historical actions taken by a user relative to historical transactions, wherein each historical transaction comprises a plurality of attributes;

based on the attributes associated with each of the historical transactions, automatically generating a representation of each historical transaction as a mixed vector comprising:

a numeric component; and a non-numeric component;

automatically analyzing the historical actions of the user with respect to the historical transactions to generate a plurality of rules, each rule being associated with a vector; and automatically comparing the vectors associated with the rules to a mixed vector associated with a target transaction to determine that the target transaction is likely to be erroneous; and at an output device, outputting a notification to the user to indicate that the target transaction is likely to be erroneous.

2. The method of claim 1, wherein automatically analyzing the historical actions of the user with respect to the historical transactions to generate the plurality of rules comprises generating the plurality of rules without reference to any rules provided by the user.

3. The method of claim 1, wherein:

the target transaction comprises a plurality of attributes, each of which falls within one of a plurality of categories;

automatically analyzing the historical actions of the user with respect to the historical transactions to generate the plurality of rules comprises analyzing historical actions of the user relative to historical transactions that also have the attributes; and automatically comparing the vectors associated with the rules to the mixed vector associated with the target transaction comprises comparing the attributes of the target transaction with the rules.

4. The method of claim 3, wherein the mixed vector associated with each historical transaction comprises:

a numeric component; and a non-numeric component based on the attributes of the historical transaction.

5. The method of claim 4, wherein automatically analyzing the historical actions of the user with respect to the historical transactions to generate the plurality of rules further comprises utilizing a decision tree method that operates directly on the mixed vectors.

6. The method of claim 4, wherein automatically analyzing the historical actions of the user with respect to the historical transactions to generate the plurality of rules further comprises utilizing a one-hot encoding scheme to apply a gradient-based machine learning method to the user data.

7. The method of claim 4, wherein automatically analyzing the historical actions of the user with respect to the historical transactions to generate the plurality of rules further comprises learning an embedding scheme applied to the historical transactions to generate a low-dimensional representation of each of the mixed vectors.

8. The method of claim 7, wherein automatically analyzing the historical actions of the user with respect to the historical transactions to generate the plurality of rules further comprises applying transductive learning to predict attributes that are not labeled in the historical transactions.

9. The method of claim 7, wherein generating the low-dimensional representation of each of the mixed vectors comprises:

applying a deep neural network autoencoder to encode the mixed vectors to generate encoded vectors; and decoding the encoded vectors to generate the low-dimensional representation.

10. The method of claim 3, wherein automatically analyzing the historical actions of the user with respect to the historical transactions to generate the plurality of rules comprises analyzing the historical actions of the user without receiving a listing of all possible attributes for at least one of the categories.

11. The method of claim 3, wherein automatically analyzing the historical actions of the user with respect to the historical transactions to generate the plurality of rules comprises learning a manifold that represents the historical transactions and the rules.

12. The method of claim 11, wherein automatically analyzing the historical actions of the user with respect to the historical transactions to generate the plurality of rules comprises applying a loss function.

13. The method of claim 1, wherein automatically analyzing the historical actions of the user with respect to the historical transactions to generate the plurality of rules comprises applying local interpretable model-agnostic explanations (LIME).

14. The method of claim 1, further comprising, prior to automatically comparing the vectors associated with the rules to a mixed vector associated with a target transaction, at an input device, receiving user input indicating that the rules are to be activated.

15. The method of claim 1, further comprising, after outputting the notification to the user, at an input device, receiving user input indicating that the target transaction is correct.

16. The method of claim 15, further comprising:

in response to receiving the user input indicating that the target transaction is correct, modifying the rules to generate modified rules; and automatically applying the modified rules to a second transaction to determine that the second transaction is not likely to be erroneous based on similarity between the target transaction and the second transaction.

17. A non-transitory computer-readable medium for identifying potentially erroneous transactions, comprising instructions stored thereon, that when performed by a processor, perform the steps of:

receiving user data indicative of historical actions taken by a user relative to historical transactions, wherein each historical transaction comprises a plurality of attributes;

based on the attributes associated with each of the historical transactions, automatically generating a representation of each historical transaction as a mixed vector comprising:

a numeric component; and a non-numeric component;

automatically analyzing the historical actions of the user with respect to the historical transactions to generate a plurality of rules, each rule being associated with a vector;

automatically comparing the vectors associated with the rules to a mixed vector associated with a target transaction to determine that the target transaction is likely to be erroneous; and causing an output device to output a notification to the user to indicate that the target transaction is likely to be erroneous.

18. The non-transitory computer-readable medium of claim 17, wherein automatically analyzing the historical actions of the user with respect to the historical transactions to generate the plurality of rules comprises generating the plurality of rules without reference to any rules provided by the user.

19. The non-transitory computer-readable medium of claim 17, wherein:

the target transaction comprises a plurality of attributes, each of which falls within one of a plurality of categories;

automatically analyzing the historical actions of the user with respect to the historical transactions to generate the plurality of rules comprises analyzing historical actions of the user relative to historical transactions that also have the attributes; and automatically comparing the vectors associated with the rules to the mixed vector associated with the target transaction comprises comparing the attributes of the target transaction with the rules.

20. The non-transitory computer-readable medium of claim 19, wherein the mixed vector associated with each historical transaction comprises:

a numeric component; and a non-numeric component based on the attributes of the historical transactions.

21. The non-transitory computer-readable medium of claim 20, wherein automatically analyzing the historical actions of the user with respect to the historical transactions to generate the plurality of rules further comprises:

learning an embedding scheme applied to the historical transactions to generate a low-dimensional representation of each of the mixed vectors; and applying transductive learning to predict attributes that are not labeled in the historical transactions.

22. The non-transitory computer-readable medium of claim 20, wherein automatically analyzing the historical actions of the user with respect to the historical transactions to generate the plurality of rules further comprises learning an embedding scheme applied to the historical transactions to generate a low-dimensional representation of each of the mixed vectors;

and wherein generating the low-dimensional representation of each of the mixed vectors comprises:

applying a deep neural network autoencoder to encode the mixed vectors to generate encoded vectors; and decoding the encoded vectors to generate the low-dimensional representation.

23. The non-transitory computer-readable medium of claim 19, wherein automatically analyzing the historical actions of the user with respect to the historical transactions to generate the plurality of rules comprises:

learning a manifold that represents the historical transactions and the rules; and applying a loss function.

24. The non-transitory computer-readable medium of claim 17, wherein automatically analyzing the historical actions of the user with respect to the historical transactions to generate the plurality of rules comprises applying local interpretable model-agnostic explanations (LIME).

25. The non-transitory computer-readable medium of claim 17, further comprising instructions stored thereon, that when performed by a processor, perform the steps of:

after causing the output device to output the notification to the user, causing an input device to receive user input indicating that the target transaction is correct;

in response to receiving the user input indicating that the target transaction is correct, modifying the rules to generate modified rules; and automatically applying the modified rules to a second transaction to determine that the second transaction is not likely to be erroneous based on similarity between the target transaction and the second transaction.

26. A system for identifying potentially erroneous transactions, the system comprising:

a hardware processing device configured to:

receive user data indicative of historical actions taken by a user relative to historical transactions, wherein each historical transaction comprises a plurality of attributes;

based on the attributes associated with each of the historical transactions, automatically generate a representation of each historical transaction as a mixed vector comprising:

a numeric component; and a non-numeric component;

automatically analyze the historical actions of the user with respect to the historical transactions to generate a plurality of rules, each rule being associated with a vector; and automatically compare the vectors associated with the rules to a mixed vector associated with a target transaction to determine that the target transaction is likely to be erroneous; and an output device, communicatively coupled to the hardware processing device, configured to output a notification to the user to indicate that the target transaction is likely to be erroneous.

27. The system of claim 26, wherein the hardware processing device is further configured to automatically analyze the historical actions of the user with respect to the historical transactions to generate the plurality of rules by generating the plurality of rules without reference to any rules provided by the user.

28. The system of claim 26, wherein:

the target transaction comprises a plurality of attributes, each of which falls within one of a plurality of categories;

the hardware processing device is further configured to automatically analyze the historical actions of the user with respect to the historical transactions to generate the plurality of rules by analyzing historical actions of the user relative to historical transactions that also have the attributes; and the hardware processing device is further configured to automatically compare the vectors associated with the rules to the mixed vector associated with the target transaction by comparing the attributes of the transaction with the rules.

29. The system of claim 28, wherein the mixed vector associated with each historical transaction comprises:

a numeric component; and a non-numeric component based on the attributes of the historical transaction.

30. The system of claim 29, wherein the hardware processing device is further configured to automatically analyze the historical actions of the user with respect to the historical transactions to generate the plurality of rules by:

learning an embedding scheme applied to the historical transactions to generate a low-dimensional representation of each of the mixed vectors; and applying transductive learning to predict attributes that are not labeled in the historical transactions.

31. The system of claim 29, wherein:

the hardware processing device is further configured to automatically analyze the historical actions of the user with respect to the historical transactions to generate the plurality of rules by learning an embedding scheme applied to the historical transactions to generate a low-dimensional representation of each of the mixed vectors; and the hardware processing device is further configured to generate the low-dimensional representation of each of the mixed vectors by:

applying a deep neural network autoencoder to encode the mixed vectors to generate encoded vectors; and decoding the encoded vectors to generate the low-dimensional representation.

32. The system of claim 28, wherein the hardware processing device is further configured to automatically analyze the historical actions of the user with respect to the historical transactions to generate the plurality of rules by:

learning a manifold that represents the historical transactions and the rules; and applying a loss function.

33. The system of claim 26, wherein the hardware processing device is further configured to automatically analyze the historical actions of the user with respect to the historical transactions to generate the plurality of rules by applying local interpretable model-agnostic explanations (LIME).

34. The system of claim 26, further comprising:

an input device, communicatively coupled to the hardware processing device, configured to, after the notification has been outputted to the user, receive user input indicating that the target transaction is correct;

and wherein the hardware processing device is further configured to, in response to receiving the user input indicating that the target transaction is correct:

modify the rules to generate modified rules; and automatically apply the modified rules to a second transaction to determine that the second transaction is not likely to be erroneous based on similarity between the target transaction and the second transaction.

* * * * *